United States Patent Office 2,725,381
Patented Nov. 29, 1955

2,725,381

PROCESS OF PREPARING METHYL 4-VINYL-PYRIDINIUM P-TOLUENESULFONATE

Delbert D. Reynolds and Thomas T. M. Laakso, Rochester, N. Y., assignors to Eastman Kodak Company, Rochester, N. Y., a corporation of New Jersey No Drawing. Application February 2, 1953,
Serial No. 334,718

4 Claims. (Cl. 260—294.8)

This invention relates to a process for preparing quaternized vinylpyridine polymers and new intermediates useful in preparing them. More particularly, this invention relates to a method for making quaternized 4-vinylpyridine polymers and new intermediates useful in preparing them.

Quaternary salts of polyvinylpyridine have been previously described. The methods of making these compounds have previously used high temperatures, the starting material being either polyvinylpyridine and an alkyl salt, or vinylpyridine monomer and an alkyl salt. Generally, an inert reaction medium provides many advantages not realized otherwise. See U. S. Patents 2,484,420 and 2,484,430, both dated October 11, 1949.

We have now found that certain solvents are unique in the preparation of poly-4-vinylpyridine metho-p-toluenesulfonate from 4-vinylpyridine and methyl p-toluenesulfonate in that they provide purer products, in less time, which have a higher molecular weight than those heretofore obtained. We have further found that the use of a certain amount of water with the water-miscible members of this solvent group provides products having a molecular weight higher than those obtained in the absence of water.

We have further found that certain other solvents can be used, in substantially anhydrous form, at temperatures below to 25° C. to provide not quaternized polymer, but quaternized monomer instead.

It is accordingly, an object of our invention to provide an improved process for preparing quarternized 4-vinylpyridine monomer and polymer. Another object is to provide a process for making high molecular weight polymethyl 4-vinylpyridinium p-toluenesulfonate. Still another object is to provide a process for making high molecular weight polymethyl 4-vinylpyridinium p-toluenesulfonate in substantially pure form. Other objects will become apparent from a consideration of the following description and examples.

According to our invention we prepare 4-vinylpyridine metho-p-toluenesulfonate monomer by intermixing 4-vinylpyridine and methyl p-toluenesulfonate at a temperature not above 25° C. in the presence of a solvent selected from the group consisting of alkyl acetates, such as methyl, ethyl, n-propyl, isopropyl, n-amyl, etc., acetates, benzene, toluene, methyl alkyl ketones wherein the alkyl group contains from 2 to 4 carbon atoms, such as ethyl methyl ketone, methyl n-propyl ketone, isopropyl methyl ketone, n-butyl methyl ketone, etc., diethyl ether, and diisopropyl ether. These solvents, which are employed in substantially anhydrous form, are not solvents for the quaternized monomer, which precipitates from the homogeneous solution as it is formed. While 4-vinylpyridine is soluble in the solvents listed above, the quaternized monomer is not. The insolubility of the quaternized monomer in the "solvent" is desirable for the reason that polymerization is substantially avoided under these conditions, i. e. of use of a non-solvent for the quaternized monomer and a temperature not exceeding 25° C. The advantage of first obtaining quaternized monomer before polymerization is that a polymer having a high molecular weight can be obtained from this substantially pure quaternized monomer. We have found that 4-vinylpyridine does not interpolymerize with 4-vinylpyridine metho-p-toluenesulfonate, hence the presence of 4-vinylpyridine during the polymerization of 4-vinylpyridine metho-p-toluenesulfonate prevents formation of desirably high molecular polymers of the latter in certain instances. The temperature is also an important factor and temperatures above 25° C. should not be used. Advantageously, temperatures of from −25° C. to 10° C. can be used, although lower temperatures can be employed, if desired. The substantially pure quaternized monomer can be polymerized by dissolving it in a solvent and allowing the solution to stand. (See examples below.)

The following examples illustrate the preparation of monomeric 4-vinylpyridine metho-p-toluenesulfonate (methyl 4-vinylpyridinium p-toluenesulfonate.)

*Example 1*

A mixture of 873 g. of methyl p-toluenesulfonate and three liters of ethyl acetate was cooled to −15° C. To this was added, with stirring, 472.5 g. of 4-vinylpyridine. This solution was placed in a refrigerator (−15° C.). Within five minutes methyl 4-vinylpyridinium toluenesulfonate crystals began to separate. After six days this product was filtered, the filtrate washed with cold ethyl acetate, and dried. Yield 527.5 g., M. P. 138–139° C.

It is not necessary to operate at this low temperature. A similar run at 25° C. for 24 hours gave a 76% yield of pure monomer.

*Example 2*

A mixture of 5.3 g. 4-vinylpyridine and 9.7 g. methyl p-toluenesulfonate in 50 cc. of methyl ethyl ketone was cooled in an 8° C. bath. After fifteen minutes crystalline methyl 4-vinylpyridinium toluenesulfonate separated. After 24 hours at 8° C., this crystalline product melted at 132° C.

A similar mixture run at 25° C. separated as crystalline material but within a short time this product began to polymerize and after 24 hours a high viscosity product had formed.

When 2-vinylpyridine is quaternized with methyl p-toluenesulfonate at room temperature, the crystalline monomer does separate, but it is contaminated with polymer. When temperatures low enough to prevent polymerization are used, the quaternization rate is too slow to permit the monomer to be formed in a reasonable length of time. This difficulty is not encountered with 4-vinylpyridine.

The effect of water on the quaternization and polymerization of the monomeric 4-vinylpyridine can be seen by reference to the following example.

*Example 3*

Several samples each consisting of 5.2 g. 4-vinylpyridine, 9.7 g. methyl p-toluenesulfonate and 50 cc. methyl ethyl ketone were mixed at 25° C. These samples contained increasing amounts of water as shown in Table I. After 5–10 minutes crystalline methyl 4-vinylpyridinium toluenesulfonate separated from the mixture containing no water. In all other samples the product separated as a curd-like polymer. Examination of the viscosities shows the effect of water upon the overall reaction.

Fifty cc. water and 20 cc. acetone were added to the reaction mixtures in order to form solutions for viscosity determinations.

TABLE I

| Sample | G. H₂O Added | Time for Appearance of Separated Product, minutes | Viscosity (25°) Centistokes (after 24 hrs.) |
|---|---|---|---|
| 1 | 0 | 5-10 | 79 |
| 2 | 0.4 | 5-10 | 73 |
| 3 | 0.8 | 15 | 73 |
| 4 | 1.6 | 20 | 35 |
| 5 | 3.2 | 25 | 31 |

The following example illustrates the manner whereby the monomeric methyl 4-vinylpyridinium p-toluenesulfonate can advantageously be polymerized to a high molecular weight polymer.

*Example 4*

145.5 g. of methyl 4-vinylpyridinium p-toluenesulfonate, obtained as described in Example 1 above, 490 cc. of acetone and 40 cc. of distilled water were mixed together to give a homogenous solution. After polymerization had taken place, 360 cc. of distilled water were added. The resulting clear dope had a viscosity of 640 centistokes (run at 25° C. in a Cannon-Fenske pipette).

Other solvents for the quaternized monomer can be used alone, or together with water, in a like manner.

Advantageously, we prepare polymethyl 4-vinylpyridinium p-toluenesulfonate from 4-vinylpyridine and methyl p-toluenesulfonate in a single step through the use of certain solvents for the quaternized monomer and temperatures not exceeding 40° C. These solvents are acetone, chloroform, and 1,4-dioxane. Temperatures of from 15° C. to 40° C. are particularly useful, although lower temperatures can be used, if desired. Water, in controlled amounts, can be added to produce polymers having a molecular weight higher than that obtainable under anhydrous conditions. It is advantageous to employ a slight excess of methyl p-toluenesulfonate over the stoichiometric quantity (i. e. equimolecular amount, based on amount of 4-vinylpyridine), since undesirable color formation can thus be largely avoided. An excess of from 1 to 10 percent by weight of methyl p-toluenesulfonate can be advantageously employed.

The following examples will serve to illustrate further the manner whereby we practice this embodiment of our invention.

*Example 5*

A mixture of 52.5 g. 4-vinylpyridine and 97 g. methyl p-toluenesulfonate in 500 cc. of chloroform was placed at room temperature. After two hours a viscous dope had formed. After three days no product had separated. The viscosity of the resulting polymer was sixty centistokes as compared to 62.5 centistokes for the corresponding polymer prepared in acetone.

While the quaternized polymer is soluble in chloroform as shown in the above example, it is not soluble in acetone or 1,4-dioxane. The addition of water to these latter two solvents does give a medium which will dissolve the quaternized polymer, thus preventing incipient precipitation.

*Example 6*

52.5 g. of 4-vinylpyridine, 97 g. of methyl p-toluenesulfonate (4 g. excess) and 500 cc. of acetone were mixed and left at room temperature for about 15 hours. The precipitated polymer was brought into solution by the addition of 400 cc. of water.

*Example 7.—Effect of water on quaternization and polymerization in acetone*

52.5 g. of 4-vinylpyridine (freshly distilled), 97 g. of methyl p-toluenesulfonate, 500 cc. of acetone, and an amount of water indicated in the tables below were mixed and left at room temperature for 24 hours. The reaction mixtures were then worked up by adding 400 cc. of water. The viscosity of pH were then determined.

TABLE II

| Sample | G. H₂O | Color after 1 hr. | Color after 24 hrs. | Viscosity Centistokes | pH |
|---|---|---|---|---|---|
| 1 | 0 | Light pink | Off White | 61.7 | 6.02 |
| 2 | 0.5 | do | do | 54.6 | 6.03 |
| 3 | 1.0 | do | do | 47.7 | 6.02 |
| 4 | 2.0 | Pink | do | 43.7 | 6.08 |
| 5 | 4.0 | Pink (2 layers) | Lower layer just visible | 43.4 | 6.07 |
| 6 | 8.0 | Dark pink (2 layers) | Lower layer quite visible | 80.4 | 6.10 |
| 7 | 16.0 | do | Orange lower layer | 72.4 | 6.12 |
| 8 | 32.0 | do | Orange lower layer, opaque upper layer. | 28.3 | 6.02 |
| 9 | 64.0 | Red (Homogeneous) | do | 8.4 | 6.04 |
| 10 | 128.0 | Dark Red (Homogeneous) | Homogeneous Orange color | 3.8 | 6.08 |

TABLE III

| Sample No. | G. H₂O | Color after 1 hr. | Color after 24 hrs. | Viscosity Centistokes | pH |
|---|---|---|---|---|---|
| 1 | 0 | Light pink | Nearly colorless | 51.4 | 5.63 |
| 2 | 0.5 | do | do | 43.3 | 5.60 |
| 3 | 1.0 | do | Slight orange, bottom layer | 37.6 | 5.80 |
| 4 | 2.0 | Pink | do | 35.4 | 5.85 |
| 5 | 4.0 | do | Dark orange, bottom layer | 46.6 | 5.95 |
| 6 | 8.0 | Dark pink | do | 64.6 | 6.00 |
| 7 | 16.0 | do | Orange solid, bottom layer | 65.2 | 6.00 |
| 8 | 32.0 | do | do | 24.7 | 5.94 |
| 9 | 64.0 | Red | Orange liquid, bottom layer | 7.9 | 5.95 |
| 10 | 128.0 | do | Orange solution | 3.3 | 5.95 |

There are two effects produced by the water. This is probably brought about by an ionization of the quaternary salt with an accompanying shift of electrons away from the double bond. However, at the same time the presence of some water in the acetone increases the solubility of the monomeric methyl 4-vinylpyridinium p-toluenesulfonate, as well as its polymeric form, in the reaction medium. This permits a more homogeneous reaction mixture which results in a higher degree of polymerization. An amount of water varying from 1.5 to 4 percent by weight, based on the weight of the solvent is particularly advantageous, as can be seen by reference to the above tables.

*Example 8.—Reaction of 4-vinylpyridine with methyl p-toluenesulfonate in various media*

52.5 g. of 4-vinylpyridine, 97 g. of methyl p-toluenesulfonate, and 500 cc. of the reaction medium indicated in the table below were mixed together and left at room temperature for 24 hours. The results are given below.

TABLE IV

| Reaction Medium | Observations |
| --- | --- |
| Benzene | Colorless precipitate, some monomer, apparently a mixture. |
| Ethanol | Red, non viscous, very little polymerization. |
| Chloroform | Viscous dope, very clear and colorless. |
| Dioxane | Solid product, largely polymer, possibly some monomer. |
| Dimethyl formamide | Brown solution, only slight polymerization. |
| Pet. ether | Immiscible—exploded due to heat of reaction. |
| Isopropyl ether | Mostly crystalline white monomer—perhaps a little polymer. |
| Ethyl acetate | Pure, white monomer. |
| Acetone | White polymer. |

The molecular weight of certain of the polymers thus obtained was measured by determining the viscosity of the polymers' aqueous solutions. Thus, 400 cc. of water were added to the various reaction media and the viscosities measured. In the case of chloroform, 400 cc. of water were added and the chloroform extracted with ether. Residual ether was removed and the volume adjusted by adding 500 cc. of acetone. The results are given below.

TABLE V

| Reaction Medium | Viscosity, Centistokes |
| --- | --- |
| Chloroform | 60.0 |
| Dioxane | 75.6 |
| Dimethyl formamide | 5.5 |
| Ethanol | 5.9 |
| Acetone | 62.5 |

The polymers obtained according to our invention are not subject to substantial decomposition on standing for reasonable lengths of time, as can be seen by reference to the following table. The drop in pH is due to hydrolysis of excess methyl p-toluenesulfonate to the sulfonic acid, and this effect is not harmful. The drop in pH can be avoided by addition of a small amount of caustic. The ageing tests were carried out at room temperature.

TABLE VI

| Time in days | Viscosity, Centistokes | pH |
| --- | --- | --- |
| 0 | 132.5 | 6.30 |
| 1 | 123.6 | 5.63 |
| 2 | 122.5 | 5.60 |
| 3 | 121.0 | |
| 6 | 121.4 | |
| 14 | 122.9 | |
| 34 | 119.5 | |
| 41 | 118.2 | 2.45 |
| 132 | 116.5 | |

Use of unduly large amounts of solvents in the processes of Examples 3 to 8 causes a lowering of molecular weight due to the well known dilution effect. It is well known that dilute solutions reduce the number of effective molecular collisions and hence the molecular weights of the products. The most advantageous concentration of solvent varies, depending on the nature of solvent, temperature, etc., and can be readily determined by making the customary tests employed in the polymerizing art. In general, a concentration of from 6 to 11 times (by weight) of the amount of 4-vinylpyridine is convenient.

No polymerization catalyst is required in producing the polymers of our invention. Moreover, we have found that certain conventional catalysts, e. g. benzoyl peroxide, cause the formation of low molecular weight products even when used in small amounts.

The above examples illustrate methyl p-toluenesulfonate as the quaternizing agent. Other alkyl salts, such as ethyl benzenesulfonate, n-propyl p-toluenesulfonate, n-propyl benzenesulfonate, diethyl sulfate, and ethyl bromide, have been employed under similar conditions, but only disappointing results have been observed. While polymers were obtained, the molecular weights were not, in general, high, nor did the polymers have good solubility properties in many instances.

The quaternized polymers of our invention are particularly useful as mordants in various photographic color processes, wherein they prevent or inhibit wandering of the dyes from one layer to another where their presence is not desired. It is important, therefore, that the polymers have solubility in water, but be non-wandering in the finished film. The wandering characteristics are, of course, largely dependent on molecular weight.

What we claim as our invention and desire secured by Letters Patent of the United States is:

1. A process for preparing methyl 4-vinylpyridinium p-toluenesulfonate comprising intermixing 4-vinylpyridine and methyl p-toluenesulfonate at a temperature not higher than 25° C. in the presence of a substantially anhydrous solvent selected from the group consisting of alkyl acetates wherein the alkyl group contains from 1 to 5 carbon atoms, methyl alkyl ketones wherein the alkyl group contains from 2 to 4 carbon atoms, benzene, toluene, diethyl ether, and diisopropyl ether, and maintaining said temperature at no higher than 25° C. while the methyl 4-vinylpyridine p-toluenesulfonate thus formed precipitates from said anhydrous solvent.

2. A process according to claim 1 wherein the temperature is −25° C. to +25° C.

3. A process according to claim 1 wherein the anhydrous solvent is ethyl acetate.

4. A process according to claim 1 wherein the anhydrous solvent is methyl ethyl ketone.

References Cited in the file of this patent

UNITED STATES PATENTS

| | | |
| --- | --- | --- |
| 2,484,420 | Minsk et al. | Oct. 11, 1949 |
| 2,484,430 | Sprague et al. | Oct. 11, 1949 |
| 2,548,564 | Sprague et al. | Apr. 10, 1951 |
| 2,573,662 | Duesel et al. | Oct. 30, 1951 |
| 2,581,869 | Kyrides | Jan. 8, 1952 |